United States Patent [19]

Yokouchi et al.

[11] Patent Number: 4,809,071
[45] Date of Patent: Feb. 28, 1989

[54] TELEVISION CAMERA DEVICE AND X-RAY TELEVISION APPARATUS USING THE SAME

[75] Inventors: Hisatake Yokouchi, Tokyo; Masanori Maruyama, Tokorozawa; Fumitaka Takahashi; Masayuki Tsuneoka, both of Kashiwa, all of Japan

[73] Assignee: Hitachi, Ltd. & Hitachi Medical Corp., Tokyo, Japan

[21] Appl. No.: 941,641

[22] Filed: Dec. 15, 1986

[30] Foreign Application Priority Data

Dec. 16, 1985 [JP] Japan .................................. 60-280946
Feb. 21, 1986 [JP] Japan .................................. 61-35162

[51] Int. Cl.$^4$ .......................... H04N 5/34; H01J 31/38
[52] U.S. Cl. ..................................... 358/111; 358/217; 378/99
[58] Field of Search ............... 358/111, 217, 218, 219; 378/99, 146; 315/382.1; 350/213 VT

[56] References Cited

U.S. PATENT DOCUMENTS

| | | | |
|---|---|---|---|
| 3,504,225 | 3/1970 | Shimada et al. ................. | 315/382.1 |
| 4,174,525 | 11/1979 | Dechering et al. ................. | 358/217 |
| 4,323,811 | 4/1982 | Garfield ....................... | 250/213 VT |
| 4,331,980 | 5/1982 | Ryan ..................... | 358/219 |
| 4,555,728 | 11/1985 | Fenster et al. ........................ | 378/99 |
| 4,590,518 | 5/1986 | Fenster et al. ...................... | 358/111 |
| 4,593,321 | 6/1986 | Bloom et al. ........................ | 358/217 |
| 4,704,635 | 11/1987 | Nudelman ........................... | 358/217 |

Primary Examiner—Carolyn E. Fields
Assistant Examiner—Joseph Hynds
Attorney, Agent, or Firm—Antonelli, Terry & Wands

[57] ABSTRACT

A television camera device for obtaining an image of high resolution by making the number of scanning lines on the target plate of an image pickup tube about twice larger than that in the television standard system and making the scanning speed of electron beam at the surface of the target plate smaller than that in the television standard system, is disclosed in which an electric field intensity in a region between the target plate and a mesh electrode (namely, the fourth grid electrode) is made greater than or equal to 5.3 KV/cm, to improve the landing characteristics of scanning electron beam, thereby preventing the occurrence of the water fall phenomenon peculiar to a slow scanning operation.

14 Claims, 4 Drawing Sheets

TELEVISION CAMERA DEVICE AND X-RAY TELEVISION APPARATUS USING THE SAME

BACKGROUND OF THE INVENTION

The present invention relates to a television camera which is used as an input device for obtaining picture images and sends out less than 30 frames per second, that is, performs a slow scanning operation, and a television camera which is small in the imaging area scanned with an electron beam.

A large number of television cameras now on the market adopt a scanning system, in which the number of frames per second is 30, the number of scanning lines is 525, and interlaced scanning is carried out. (The above scanning system will hereinafter be referred to as "television standard system"). A frequency bandwidth B required for the above case is given by the following equation:

$$B = \tfrac{1}{2} mnf_v a/(1 - a) \text{Hz} \qquad (1)$$

where m indicates the horizontal resolution, n the number of scanning lines, $f_v$ a vertical scanning frequency, a an aspect ratio, and $\alpha$ the rate of blanking period in horizontal scanning.

Further, the signal-to-noise ratio S/N of a video signal obtained by a television camera is given by the following equations:

$$S/N = i_s/i_n \qquad (2)$$

$$i_n^2 = 2eBi_s + 4kTB/R_L + \tfrac{16}{3} kT\pi^2 R_e C^2 B^3 \qquad (3)$$

where $i_s$ indicates a signal current, e the electronic charge, k the Boltzmann's constant, T an absolute temperature, $R_L$ the load resistance of an image pickup tube, $R_e$ the equivalent noise resistance of an FET in the first stage used of a pre-amplifier, and C the stray capacitance connected in parallel with the load resistance $R_L$ and given by the sum of the stray capacitance $C_i$ of the FET and the stray capacitance $C_o$ of the image pickup tube.

In a case where a television camera is used as the input device of an image processor or radiation image detector, it is required to increase the resolution of an image obtained by the television camera and to enhance the signal-to-noise ratio of a video signal sent out from the television camera. In order to increase the resolution of the image, the number of scanning lines in the television camera is increased from 525 to 1,050 or more, and the number of picture elements contained in one picture image is increased from 500×500 to 1,000×1,000. In this case, when the vertical scanning frequency $f_v$ is made equal to 60 Hz as in the television standard system, the frequency bandwidth B becomes four times larger than that required for the television standard system, and thus the signal-to-noise ratio is reduced.

In order to enhance the signal-to-noise ratio, various countermeasures have been worked out. That is, ① an increase in signal current (for example, the maximum value $i_{smax}$ of signal current is increased from 300 nA to a current range from 400 to 500 nA) ② the use of a pin-lead type image pickup tube having a stray capacitance as small as 2 to 3 pF, ③ the use of an FET having small stray capacitance, and ④ the optimization of a pre-amplifier. However, these countermeasures are insufficient.

Hence, it is necessary to decrease the vertical scanning frequency $f_v$, that is, to reduce the number of frames per second, thereby preventing the increase in frequency bandwidth B and ensuring a desired signal-to-noise ratio. For example, when the number of frames per second is made equal to 7.5 and the number of picture elements contained in one picture image is made equal to 1,000×1,000, the frequency bandwidth B required for this case is about 5 MHz. That is, this frequency bandwidth is substantially equal to the frequency bandwidth required for the television standard system using 525 scanning lines, in spite of the fact that the number of scanning lines is increased to more than one thousand in the above case.

In the above scanning system having high spacial resolution and low time resolution, however, the scanning speed of an electron beam at the surface of a target plate of an image pickup tube is reduced. Owing to such a reduction in the scanning speed, the landing characteristics of the scanning electron beam for the target plate are degraded, and a so-called "water fall" phenomenon is readily generated which is not observed in the scanning operation of the television standard system. The "water fall" phenomenon is a phenomenon that a wave pateern is generated mainly in a peripheral portion of an image and degrades the picture quantity of the image.

SUMMARY OF THE INVENTION

An object of the present invention is to provide a television camera device which is high in signal-to-noise ratio and spacial resolution, and does not cause "water fall" phenomenon.

Another object of the present invention is to provide a television camera device having a plurality of operation modes which are suitable for use in an X-ray television apparatus.

In order to attain the above objects, according to one aspect of the present invention, there is provided a television camera device provided with an image pickup tube which includes a target plate and a mesh electrode, and in which a slow scanning operation generating less than 30 frames per second is carried out, the maximum value of a signal current is made greater than or equal to 300 nA, and the electric field intensity in a region between the target plate and the mesh electrode is made greater than or equal to 5.3 KV/cm.

The landing characteristics of an image pickup tube vary with the voltage $E_{C4}$ of the mesh electrode $G_4$, a ratio of a voltage $E_{C3}$ of a collimation electrode $G_3$ to the voltage $E_{C4}$, the signal current $i_s$, a beam current $i_b$ and the scanning speed, and further vary depending upon the structure of an electron gun, that is, whether the electron gun is of the diode gun type or the triode gun type. In more detail, the possibility of the occurrence of the "water fall" phenomenon decreases, as the maximum value $i_{smax}$ of signal current is smaller or a ratio of the scanning electron beam current $i_b$ to the signal current $i_s$ (that is, a ratio $i_b/i_s$) is closer to one. However, when the maximum value $i_{smax}$ of signal current is reduced, the signal-to-noise ratio is lowered. While, the ratio $i_b/i_{smax}$ has some connection with the stability of the operation of the television camera, and is required to have a desired value (for example, 1.5 or 2.0). Further, the present inventors found that, when each of $i_{smax}$ and $i_b/i_{smax}$ was set to a desired value, it depended upon the electric field intensity in a region between the target plate and the mesh electrode whether the "water fall" phenomenon took place or not. In other words, it was found that, in order to ensure a high signal-to-noise ratio for a signal current of 300 nA or more, the above electric field intensity was required to be equal to or greater than 5.3 KV/cm.

DESCRIPTION OF THE PREFERRED EMBODIMENTS

Figure 1:
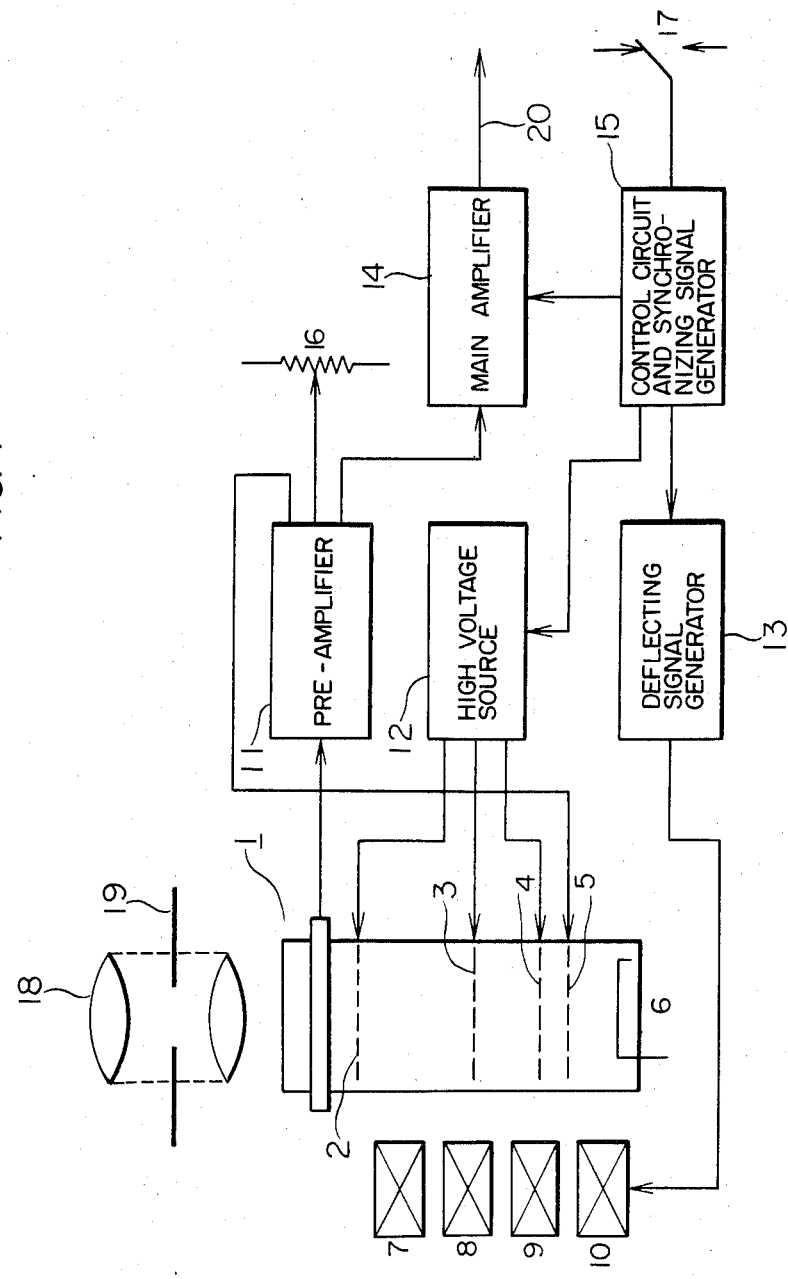
FIG. 1 is a block diagram showing an embodiment of a television camera device according to the present invention.

FIG. 1 shows the construction of an embodiment of a television camera device according to the present invention. In FIG. 1, reference numeral 1 designates a 1-inch, triode gun type image pickup tube of the magnetic-focus, magnetic-deflection system (namely, the M-M system) in which a photoconductive layer of blocking type is used as a target, 2 a mesh electrode (namely, the fourth grid electrode), 3 a collimation electrode (namely, the third grid electrode), 4 an acceleration electrode (namely, the second grid electrode), 5 a beam control electrode (namely, the first grid electrode), 6 a cathode, 7 a focusing coil, 8 an alignment coil, 9 a horizontal deflection coil, 10 a vertical deflection coil, 11 a pre-amplifier, 12 a high voltage source, 13 a deflecting signal generator, 14 a main amplifier, and 15 a control circuit/synchronizing signal generator.

In the present embodiment shown in FIG. 1, a voltage $V_T$ applied to the target is 50 V higher than a cathode voltage which is used as a reference voltage. Further, the deflecting signal generator 13 delivers a deflecting signal for scanning an effective area of 13 mm × 13 mm on the surface of the target with an electron beam in such a manner that 1,050 scanning lines are formed on the above area. The vertical synchronizing frequency $f_v$ and the horizontal synchronizing frequency are set to 7.5 Hz and 7.875 KHz, respectively, and a synchronizing signal controlled by these frequencies is sent out from the control circuit/synchronizing signal generator 15. Thus, the scanning speed of the electron beam at the target surface is about 121 m/sec, and is smaller than a scanning speed in a case where the television standard system is used in a 1-inch image pickup tube. The change-over switch 17 is used for selecting one of a standard scanning mode and a slow scanning mode. Thus, the image pickup tube can be operated in the slow scanning mode only for a desired period. An output signal 20 from the main amplifier 14 is applied to a television monitor (not shown), to observe the image of an object.

The signal current $i_s$ in the television camera can be controlled by adjusting an optical iris 19 which is provided in a lens system 18, in accordance with the brightness of the object. Further, the scanning electron beam current $i_b$ is dependent upon a voltage $E_{C1}$ applied to the beam control electrode 5. The voltage $E_{C1}$ can be varied by adjusting a variable resistor 16. Therefore, the scanning electron beam current $i_b$ can be controlled by the variable resistor 16.

The inventors studied operating conditions of the present embodiment using a 1-inch image pickup tube, for preventing the occurrence of the "water fall" phenomenon in a slow scanning mode.

Figure 2:
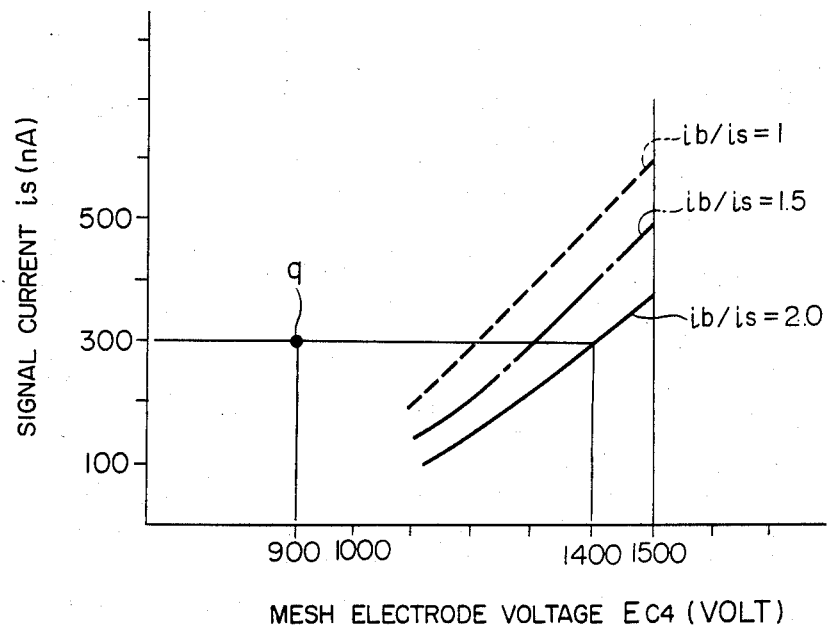
FIG. 2 is a graph showing upper limits of those operation ranges of the embodiment of FIG. 1, within which the "water fall" phenomenon is never generated.

FIG. 2 shows those operation ranges capable of preventing the occurrence of the "water fall" phenomenon which were experimentally determined with respect to the voltage $E_{C4}$ of the mesh electrode expressed in values relative to the cathode voltge (namely, the reference voltage) and the signal current $i_s$, for three values of the ratio $i_b/i_s$. A heavy line shown in FIG. 2 indicates the upper limit of that operation range for a case where the ratio $i_b/i_s$ is equal to 2, within which the "water fall" phenomenon does not occur. When the signal current $i_s$ is made greater than the current value indicated by a point on the solid line or the voltage $E_{C4}$ is made smaller than the voltage value indicated by the above point, the "water fall" phenomenon occurs. For example, when the voltage $E_{C4}$ of the mesh electrode and the signal current $i_s$ are made equal to 900 V and 300 nA, respectively, in a slow scanning mode as in the television standard system, these operating conditions are indicated by a point q in FIG. 2, and the "water fall" phenomenon is generated. That is, the voltage $E_{C4}$ in the slow scanning mode is required to be higher than that in the television standard system. For example, when the voltage $E_{C4}$ is increased to 1,400 V for the case of $i_s = 300$ nA, the "water fall" phenomenon does not occur. Further, if the signal current $i_s$ is made smaller than 300 nA, the "water fall" phenomenon will not occur even when the voltage $E_{C4}$ is set to a value less than 1,400 V. However, when the signal current $i_s$ is reduced, the signal-to-noise ratio of a video signal corresponding to the image of the object is decreased. Hence, it is undesirable to make the signal current $i_s$ smaller than 300 nA. That is, in order to obtain a video signal of a high signal-to-noise ratio and an image of high picture quality, it is necessary to make the maximum value $i_{smax}$ of signal current greater than or equal to 300 nA and to make the voltage $E_{C4}$ greater than or equal to 1,400 V.

A dot-dash line shown in FIG. 2 indicates the upper limit of that operation range for a case where the ratio $i_b/i_s$ is equal to 1.5, within which the "water fall" phenomenon does not occur. In this case, wen the voltage $E_{C4}$ is set to 1,400 V, the "water fall" phenomenon does not occur as long as the signal current $i_s$ is less than 400 nA. Thus, the S/N ratio (namely, signal-to-noise ratio) of the video signal can be increased. Further, a broken line shown in FIG. 2 indicates the upper limit of that operation range for a case where the ratio $i_b/i_s$ is equal to 1.0, within which the "water fall" phenomenon does not occur. In this latter case, even when the signal current $i_s$ is set to 300 nA and the voltage $E_{C4}$ is set to 1,200 V, the "water fall" phenomenon does not occur. However, when a television camera is operated under a condition that the ratio $i_b/i_s$ is equal to 1.0, no margin is left for variations in the brightness of an object, and there is a great possibility of the occurrence of sticking due to the insufficiency of intensity of the scanning electron beam. That is, the television camera cannot perform a stable operation. Therefore, in a case where the maximum value $i_{smax}$ of signal current $i_s$ set to a value equal to or greater than 400 nA to obtain a video signal of a high S/N ratio, it is necessary not only to make the voltage $E_{C4}$ higher than or equal to 1,400 V but also to set the scanning electron beam current $i_b$ so that a relation $i_{smax} < i_b \leq 1.5\ i_{smax}$ is satisfied.

Figure 3:
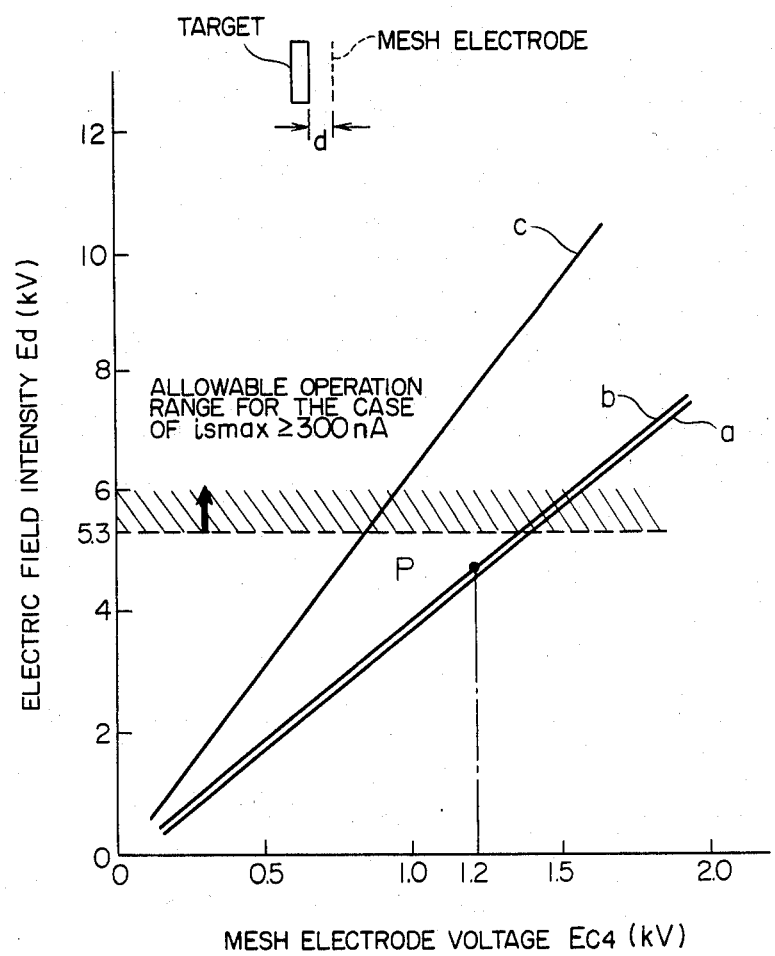
FIG. 3 is a graph showing that operation range of various image pickup tubes, within which the "water fall" phenomenon does not occur.

FIG. 3 shows that operation range capable of preventing the occurrence of the "water fall" phenomenen, which was determined with respect to the electric field intensity in a region between the target of an image pickup tube and the mesh electrode, and is partly based upon the experimental results of FIG. 2. The voltage $V_T$ applied to the target and the distance d between the target and the mesh electrode are dependent upon the kind of image pickup tube. While, the landing characteristics of scanning electron beam are dependent, not on the voltage $E_{C4}$ of the mesh electrode but on the electric field intensity in a region between the target and the mesh electrode. Accordingly, the operation ranges having been explained by reference to FIG. 2 (that is, a first range indicated by $i_{smax} \geq 300$ nA and $E_{C4} \geq 1,400$ V and a second range indicated by $i_{smax} < i_b \leq 1.5\ i_{smax}$ and $E_{C4} \geq 1,400$ V for making it possible to increase the maximum signal current $i_{smax}$ to 400 nA or more) are not considered to be common to various image pickup tubes. In view of the above, the inventors studied a desired operation range for each of three kinds of image pickup tubes. The first one of the image pickup tubes was the 1-inch triode gun type image pickup tube of FIG. 1 in which the target voltage $V_F$ was equal to 75 V and the distance d between the target and the mesh electrode was equal to 2.5 mm, the second image pickup tube was a 1-inch diode gun type image pickup tube in which the target voltage $V_T$ was equal to 50 V and the distance d was equal to 2.5 mm, and the third image pickup tube was another 1-inch diode gun type image pickup tube in which the target voltage $V_T$ was equal to 50 V and the distance d was equal to 1.5 mm. FIG. 3 shows relations between the voltage $E_{C4}$ of the mesh electrode and the electric field intensity $E_d$ in a region between the target and the mesh electrode, for the above image pickup tubes, and further shows an operation range, within which the "water fall" phenomenon does not occur. The electric field intensity $E_d$ is given by the following equation:

$$E_d = \frac{E_{C4} - E_T}{d} \quad (4)$$

where $E_{C4}$ indicates the voltage of the mesh electrode, $E_T$ the voltage of the target, and d the distance between the target and the mesh electrode.

A straight line a of FIG. 3 indicates a relation between $E_{C4}$ and $E_d$ for the first image pickup tube (that is, the image pickup tube of the present embodiment), and hence an operating condition $E_{C4} \geq 1,400$ V in the first image pickup tube corresponds to an operating condition $E_d \geq 5.3$ KV/cm. Accordingly, in the case of $i_{smax} \geq 300$ nA, it is necessary to make the field intensity $E_d$ greater than or equal to 5.3 KV/cm. Further, in FIG. 3, a straight line b indicates a relation between $E_{C4}$ and $E_d$ for the second image pickup tube, and a straight line c indicates the above relation for the third image pickup tube. It was confirmed that even when the maximum value $i_{smax}$ of signal current was made greater than or equal to 300 nA, the second and third image pickup tubes did not generate the "water fall" phenomenon as long as the field intensity $E_d$ was greater than or equal to 5.3 KV/cm, that is, lay within the hatched area of FIG. 3. Further, in a case where the condition $i_{smax} < i_b \leq 1.5\ i_{smax}$ is satisfied in the first image pickup tube, the maximum value $i_{smax}$ of signal current can be made greater than or equal to 400 nA under an operating condition $E_d \geq 5.3$ KV/cm, without causing the "water fall" phenomenon. Further, it was confirmed that when the condition $i_{smax} < i_b \leq 1.5\ i_{smax}$ was satisfied in the second and third image pickup tubes, the maximum value $i_{smax}$ of these image pickup tubes could be greater than or equal to 400 nA under the operating condition $E_d \geq 5.3$ KV/cm, without causing the "water fall" phenomenon. The second and third image pickup tubes having the $E_{C4}$-$E_d$ relations indicated by the straight lines b and c were less severe in operating condition for preventing the occurrence of the "water fall" phenomenon than the first image pickup tube. For example, when the condition $i_{smax} < i_b \leq 1.5\ i_{smax}$ was satisfied in the second image pickup tube, the maximum value $i_{smax}$ of signal current could be increased to 500 nA under operating conditions indicated by a point P in FIG. 3 (namely, operating conditions $E_d = 4.6$ KV/cm and $E_{C4} = 1,200$ V), without causing the "water fall" phenomenon.

The above experimental results can be summarized as follows. ① Even when the maximum value $i_{smax}$ of signal current is made greater than or equal to 300 nA, the occurrence of the "water fall" phenomenon can be prevented by making the field intensity $E_d$ greater than or equal to 5.3 KV/cm. ② In a case where a condition $i_{smax} < i_b \leq 1.5\ i_{smax}$ is satisfied, the maximum value $i_{smax}$ of signal current can be increased to 400 nA or more under an operating condition that the field intensity $E_d$ is greater than or equal to 5.3 KV/cm, without causing the "water fall" phenomenon. The above-mentioned operation ranges can be used for a slow scanning television camera, in which the scanning speed of electron beam is 125 m/second or less.

Incidentally, an image pickup tube which is smaller in diameter than a 1-inch image pickup tube, for example, a ½-inch image pickup tube is smaller in area scanned with an electron beam than the 1-inch image pickup tube. Accordingly, even when the ½-inch image pikcup tube performs the scanning operation of the television standard system (which generates 30 frames per second and uses 525 scanning lines), the scanning speed of electron beam is less than 125 m/sec. However, such an image pickup tube having a small diameter is small in stray capacitance and is not required to deliver a video signal having a high S/N ratio. Accordingly, the maximum value $i_{smax}$ of signal current is put in a range from 100 to 150 nA. Since the maximum signal current $i_{smax}$ is reduced to such a small value as mentioned above, there is no fear of the occurrence of the "water fall" phenomenon, even when the image pickup tube having a small diameter is operated in accordance with the television standard system.

Figure 4:
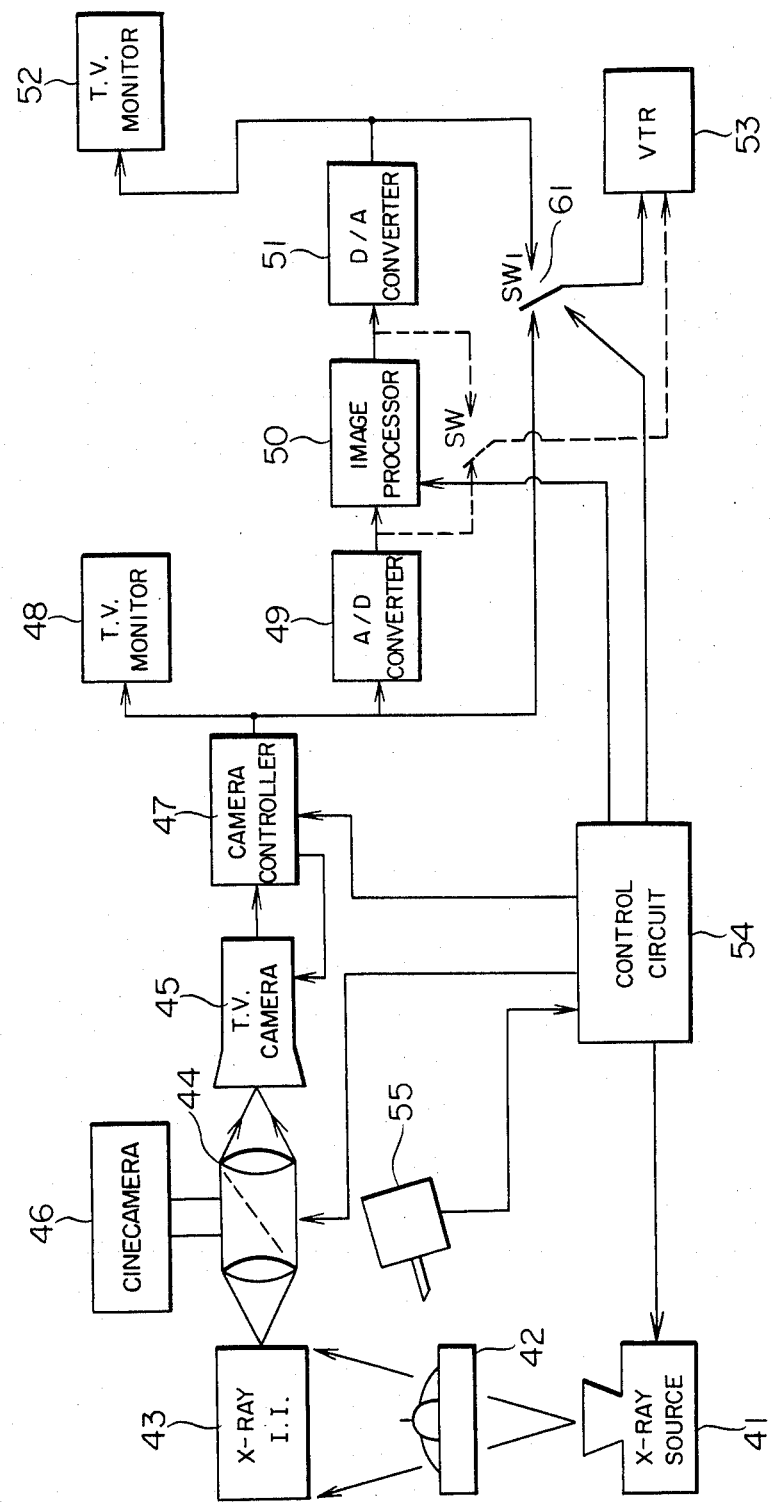
FIG. 4 is a block diagram showing an embodiment of an X-ray television apparatus according to the present invention.

FIG. 4 is a block diagram showing an embodiment of an X-ray television apparatus according to the present invention. The present embodiment has a first operation mode for causing an image pickup tube to perform such a slow scanning operation as explained by reference to FIGS. 1 to 3, to form an X-ray image having high resolution and a high S/N ratio, and second to fifth operation modes for carrying out real-time X-ray fluoroscopy.

Referring to FIG. 4, X-rays emitted from an X-ray source 41 pass through an object 42 to be inspected, and an image of the to-be-inspected object 42 formed by the transmitted X-rays is converted by an X-ray image intensifier 43 into an optical image. The optical image from the image intensifier 43 is sent to a distributor 44 made up of optical lenses and others. The optical image having passed through the distributor 44 is focused on the imaging surface of an image pickup tube mounted on a head part of a television camera 45. Also, the optical image reflected from the distributor 44 is focused on a film mounted in a cinecamera 46, if desired.

Further, a camera controller 47 for controlling the television camera 45 includes the parts 11 to 17 of FIG. 1, and further includes a control part peculiar to the present embodiment for controlling the diameter $\phi_b$ of the scanning electron beam in accordance with a specified operation mode. The beam diameter $\phi_b$ can be controlled by varying a current $I_f$ which flows through the focusing coil 7 of Fig. 1. A video signal from the camera controller 47 is applied to a television monitor 48 to display a corresponding image thereon, and is also applied to an analog-to-digital converter 49, to be converted into a digital signal. The digital signal from the converter 49 is applied to an image processor 50, to be subjected to image processing such as logarithmic conversion, addition/subtraction, image enhancement and gamma conversion. The digital signal having been subjected to the above processing is applied to a digital-to-analog converter 51, to be converted into an analog signal, which is applied to another television monitor 52, to display an image thereon. Either the output of the camera controller 47 or the output of the D-A converter 51 is selected by a switch 61, and the selected output is recorded by a video tape recorder 53. In case a conventional analog video tape recorder is not used, but instead a digital video tape recorder is used as the recorder 53, the circuit connection indicated by broken lines is used. In a case where an image of the heart, coronary arteries, or blood vessels in a desired part of human body is formed by the transmitted X-rays, a contrast medium is injected by a contrast medium injector 55 into a vein or artery. Further, a control circuit 54 controls the whole of the present embodiment, and issues a command to the camera controller 47.

In the first operation mode of the present embodiment, the television camera 45 performs the slow scanning operation which has been explained by reference to FIGS. 1 to 3. That is, an optical iris mounted in the distributor 44 is adjusted in accordance with the quantity of X-rays emitted from the X-ray source 41 so that the maximum value $i_{smax}$ of a signal current generated in the television camera 45 is greater than or equal to 300 nA, and an image of high spacial resolution and a high S/N ratio is formed by using 1,050 scanning lines. In the first operation mode, the quantity of X-rays emitted from the X-ray source 41 is in the order of, for example, 1,000 μR. While, in the second to fifth operation modes, the quantity of X-rays is made far smaller than that in the first operation mode, that is, is in the order of, for example, 1 μR, and the television camera 45 performs the scanning operation according to the television standard system (which generates 30 frames per second), to carry out X-ray fluoroscopy. In a case where the X-ray fluoroscopy is carried out by such weak X-rays, a reduction in S/N ratio due to the X-ray quantum noise $\sigma_q$ becomes a serious problem. If the rate of after image observed after about 50 miliseconds have elapsed, is expressed by k%, the X-ray quantum noise $\sigma_q$ is given by the following formula:

$$\sigma_q \propto \frac{1}{a \cdot x^{\frac{1}{2}} \cdot \Delta p^{\frac{1}{2}}} \propto \frac{1}{a \cdot \phi_b \cdot x^{\frac{1}{2}}}$$

where $\Delta p$ indicates the dimension of a picture element, x the quantity of X-rays (X-ray dose), $\phi_b$ the diameter of a scanning electron beam of an image pickup tube, and $a$ a function $$\left(\frac{1 + k/100}{1 - k/100}\right)^{\frac{1}{2}}.$$

In order to prevent a reduction in S/N ratio due to the use of a small quantity of X-rays, two methods are used. The first one of the methods is to increase the factor $a$, that is, is to increase the rate k of after image at the television camera 45, and the second method is to increase the diameter $\phi_b$ of the scanning electron beam. The rate k of after image at the television camera increases as the signal current $i_s$ thereof is smaller. In the ordinary X-ray fluoroscopy, the signal current $i_s$ is put in a range from 30 to 60 nA. In a case where the signal current $i_s$ lies within the above range, the rate k of after image can be more increased by putting a scanning electron beam current $i_b$ in a range from 1.5 to 2 times the maximum signal current $i_{smax}$. That is, in the first method, the S/N ratio is improved by putting the scanning electron beam current $i_b$ in a range from 1.5 to 2 times the signal current $i_s$. According to the first method, however, the time resolution of an image is reduced. Hence, the first method is unsuitable for a moving object. While, in the second method, the diameter $\phi_b$ of the scanning electron beam is made about 2-3 times larger than an ordinary scanning electron beam diameter. According to the second method, the S/N ratio can be improved without reducing the time resolution of an image, but the spacial resolution thereof is reduced. In view of the above facts, each of the second to fifth operation modes of the present embodiment uses operating conditions shown in the following table.

TABLE I

| Operation mode | operating conditions | | S/N ratio | Spacial resolution | time resolution | X-ray intensity |
|---|---|---|---|---|---|---|
| | diameter of scanning electron beam | scanning electron beam current | | | | |
| second mode | small | small (rate of after image is large) | ○ | Δ | X | very weak |
| third mode | large | small (rate of after image is large) | ◉ | X | X | very weak |
| fourth mode | large | large (rate of after image is small) | Δ | X | ○ | very weak |

TABLE I-continued

| Operation mode | operating conditions | | S/N ratio | Spacial resolution | time resolution | X-ray intensity |
|---|---|---|---|---|---|---|
| | diameter of scanning electron beam | scanning electron beam current | | | | |
| fifth mode | small | large (rate of after image is small) | X ◎ | ◯ ◎ | ◎ ◯ | very weak fairly strong |

◎ excellent, ◯ good, △ fairly good, X poor

That is, in the second operation mode, only the first method is used, to ensure desired spacial resolution at the sacrifice of the time resolution. In the third operation mode, both of the first and second methods are used, to obtain a high S/N ratio with a considerable sacrifice of the time resolution and spacial resolution. In the fourth operation mode, only the second method is used, to ensure desired time resolution. In the fifth operation mode, none of the first and second methods is used. That is, the spacial resolution is increased by making the scanning electron beam diameter $\phi_b$ small, and the time resolution is increased by making small the rate of after image at the television camera. In the ordinary X-ray fluoroscopy, a small amount of X-rays are used, and hence the S/N ratio is reduced when the fifth operation mode is used. However, the fifth operation mode is suitable for use in imaging techniques using a large quantity of X-rays such as cine-angiography.

As mentioned above, the present embodiment has various operation modes, and hence can produce an appropriate image in accordance with the kind and the moving speed of the to-be-inspected object. Thus, the present embodiment can improve the speed and accuracy of X-ray fluoroscopic diagnosis.

We claim:

1. A television camera device comprising an imge pickup tube having at least 1000 scanning lines with a target plate and a mesh electrode, and control means for enabling imaging without occurrence of the water fall phenomenon, said control means controlling an electron beam emitted from a cathode of the image pickup tube to perform a slow scanning of the at least 1000 scanning lines of the target plate at less than 30 frames per second, and at a scanning speed at the surface of the target plate of less than or equal to 125 m/sec, and controlling the maximum value of a signal current from the image pickup tube to be greater than or equal to 300 nA and the electric field intensity in a region between the target plate and the mesh electrode to be greater than or equal to 5.3 KV/cm so as to enable proper imaging with slow scanning at high resolution without occurrence of the water fall phenomenon.

2. A television camera device according to claim 1, wherein a scanning electron beam current of the image pickup tube is put in a range from 1.5 to 2 times the maximum value of the signal current.

3. A television camera device according to claim 2, wherein the maximum value of the signal current is made greater than or equal to 400 nA.

4. A television camera device according to claim 1, wherein the image pickup tube is of the triode gun type, and a voltage applied to the mesh electrode is higher than a cathode voltage which is used as a reference voltage, by 1,400 V or more.

5. A television camera device according to claim 1, wherein the image pickup tube is of the diode gun type, and a voltage applied to the mesh electrode is higher than a cathode voltage which is used as a reference voltage, by 1,200 V or more.

6. An X-ray television apparatus comprising:
X-ray source means for irradiating an object with X-rays;
an image intensifier receivng an X-ray image of the object for converting the X-ray image into a visible image;
a television camera provided with an image pickup tube having at least 1000 scanning lines and disposed so that the visible image is received by the image pickup tube, the image pickup tube having a cathode for emitting an electron beam and a target plate of photoconductive type and a mesh electrode;
control means for operating the image pickup tube in a first operation mode to enanble imaging without occurrence of the water fall phenomenon, in which the number of scanning lines scanned by said electron beam is at least 1000, the number of frame per second scanned by said electron beam is less than 30, a maximum signal current is greater than or equal to 300 nA, and an electric field intensity in a region between the target plate and the mesh electrode is greater than or equal to 5.3 KV/cm so as to enable proper imaging with slow scanning at high resolution without occurrence of the water fall phenomenon; and
a monitoring device for displaying an image obtained by the television camera.

7. An X-ray television apparatus according to claim 6, wherein said control means also operates the image pickup tube in a plurality of additional operation modes different from the first operation mode, said additional operation modes operate with lower X-ray quantity emitted from the X-ray source means and greater in the number of frames per second than those of the first operation mode.

8. An X-ray television apparatus according to claim 7, wherein said additional operation modes are different from the first operation mode by at least a diameter of the scanning electron beam at the surface of the target plate.

9. An X-ray television apparatus according to claim 7, wherein said additional operation modes are different from the first operation mode by at least a scanning electron beam current of the image pickup tube.

10. An X-ray television apparatus according to claim 8, wherein said control means operates the image pickup tube o that the scanning speed of said electron beam at the surface of the target plate is made less than or equal to 125 m/sec.

11. An X-ray television apparatus according to claim 6, wherein said control means operates the image pickup tube so that a scanning electron beam current of the image pickup tube is in a range from 1.5 to 2 times the maximum value of the signal current.

12. An X-ray television apparatus according to claim 6, wherein said control means operates the image pickup tube so that the maximum value of the signal current is made greater than or equal to 400 nA.

13. An X-ray television apparatus according to claim 6, wherein said image pickup tube is of the triode gun type, and a voltage applied to the mesh electrode is higher than a Cathode voltage which is used as a reference voltage, by 1,400 V or more.

14. An X-ray television apparatus according to claim 6, wherein said image pickup tube is of the diode gun type, and a voltage applied to the mesh electrode is higher than a cathode voltage which is used as a reference voltage, by 1,200 V or more.

* * * * *

UNITED STATES PATENT AND TRADEMARK OFFICE
CERTIFICATE OF CORRECTION

PATENT NO. : 4,809,071

DATED : Feb. 28, 1989

INVENTOR(S) : Yokouchi et al.

It is certified that error appears in the above-identified patent and that said Letters Patent is hereby corrected as shown below:

IN THE TITLE PAGE:

In line [73], delete "Assignee: Hitachi, Ltd. & Hitachi Medical Corp., Tokyo, Japan" and insert --Assignee: Hitachi, Ltd. & Hitachi Medical Corp., both of Tokyo, Japan--

Signed and Sealed this

Twenty-seventh Day of February, 1990

Attest:

JEFFREY M. SAMUELS

Attesting Officer     Acting Commissioner of Patents and Trademarks